June 10, 1969   J. J. FLAHERTY ET AL   3,448,606

MEDICAL DIAGNOSTIC SYSTEM

Filed Oct. 1, 1965   Sheet _1_ of 6

INVENTOR.
JOHN J. FLAHERTY
JOHN. W CLARK
PETER J. ROSAUER

*Hill, Sherman, Meroni, Gross & Simpson* ATTORNEYS

INVENTOR.
JOHN J. FLAHERTY
JOHN W. CLARK
PETER J. ROSAUER

FIG. 9

INVENTOR.
JOHN J. FLAHERTY
JOHN W. CLARK
PETER J. ROSAUER

United States Patent Office 3,448,606
Patented June 10, 1969

---

3,448,606
MEDICAL DIAGNOSTIC SYSTEM
John J. Flaherty, Elk Grove Village, John W. Clark, Winfield, and Peter J. Rosauer, Mount Prospect, Ill., assignors to Magnaflux Corporation, Chicago, Ill., a corporation of Delaware
Filed Oct. 1, 1965, Ser. No. 492,026
Int. Cl. G01n 9/24
U.S. Cl. 73—67.8        11 Claims

ABSTRACT OF THE DISCLOSURE

Medical diagnostic system in which a cross-sectional indication of interfaces in a body is obtained by means of an ultrasonic pulse-echo system while a second system provides a plan view indication, the indications being readily correlated to facilitate diagnosis. Preferably, the second system is an X-ray system operative to produce a shadow field pattern and the position of the ultrasonic transmitting and receiving means is preferably indicated in the plan view indication. Specific features of the invention relate to the production of the indications closely adjacent one another and to the support of the ultrasonic transmitting and receiving means in a palpation diaphragm plate guideway of X-ray apparatus.

---

This invention relates to a medical diagnostic system and more particularly to a system using ultrasonic waves and providing accurate and readily interpreted indications or displays of the position in character of structures within a body to facilitate a rapid and reliable diagnosis of internal conditions.

It is well known that internal bodily tissues affect the transmission of ultrasonic waves and that interfaces between tissues of differing acoustical impedances produce detectable reflections of the waves. It is also known that ultrasonic waves can be effectively used at a low power level, far below that at which damage to tissues might occur, and various systems have been proposed and tested experimentally using both continuous waves and pulsed waves and using both through-transmission and reflection techniques.

Various scanning arrangements have also been proposed. For example, a system has been proposed wherein a transducer is moved along in a direction generally parallel to a body surface while transmitting pulses of ultrasonic energy toward the surface and receiving echoes back from interfaces within the body, with a "B-scan" display being produced on the face or screen of a cathode ray tube, a trace being produced in one direction in synchronism with the transmission of the pulses and being moved in a transverse direction in synchronism with the transducer movement, the echo signals being used to intensify the spot on the screen of the cathode ray tube. This system has been used to obtain a cross-sectional indication of the structure of a human breast, with the transducer and the breast immersed in a water chamber in a manner such that the water serves as a coupling medium between the transducer and the body surface while permitting the scanning movement of the transducer. It has been possible to detect malignant tumors with some degree of success.

Such systems as heretofore proposed have not been completely satisfactory, and have presented various difficulties. One problem has been that internal structures of little interest for diagnostic purposes have produced indications which partly or entirely obscure those which are important. Another difficulty has arisen from spurious indications due to multiple reflections between interfaces in the body. A further difficulty has been that movements of structures within the body during examination have obscured those indications of primary interest and have made interpretation very difficult. Still another difficulty has been that it has been very difficult to determine the placement of particular organs within the body in relation to the ultrasonic transducer, so that there has been considerable speculation as to the meaning of particular indications, and a confident diagnosis has not been possible.

This invention was evolved with the general object of overcoming the disadvantages of prior systems and of providing an ultrasonic systm which would provide a quick, reliable and readily interpreted indication of internal bodily structures, not obtainable with prior systems.

According to an important feature of the invention, ultrasonic testing apparatus is combined with X-ray apparatus in a manner such as to make it possible to obtain much more complete information as to internal bodily structure. With this combination, one test can be used as a check against the other, and more complete information is obtained since X-rays and ultrasonic waves have different transmission characteristics and ultrasonic waves are affected by interfaces within the body which have no effect on X-rays.

In accordance with a specific feature of the invention, an ultrasonic transducer is produced between X-ray receiving means and the body under test to produce a shadow in a shadow field pattern of an X-ray image. With this feature, it is possible with the X-ray image to determine the exact location of the transducer, to facilitate placing of the transducer at a desired location for testing and to also provide information for diagnostic purposes which would not be otherwise obtainable.

Preferably, a pulse-echo operation is employed and in accordance with a further important feature of the invention a "B-scan" operation is employed to produce a cross-sectional pattern upon the face or screen of a cathode ray tube. This feature is particularly important in combination with the X-ray examination, in that the X-ray apparatus can be used to develop a plan shadow field pattern on a portion of a body under test while the ultrasonic apparatus is used to develop a cross-sectional view, to make interpretation and diagnosis much easier and much more exact.

Another feature of the invention is in the provision of means for obtaining a sector scan operation, preferably with the transducer being oscillated about an axis in approximate alignment with an end face of the transducer used for transmitting and receiving ultrasonic waves. This feature is important in permitting a scanning operation with the transducer end face directly engaged with a surface of the body and is also advantageous when the transducer is immersed in a liquid couplant. Another advantage is that the X-ray and ultrasonic indications are more readily correlated, since the transducer can be readily located on the X-ray image.

A further feature is in the provision of means for obtaining a translational scanning movement, with the transducer being moved generally parallel to a body surface, which can be used alone or in combination with the sector scan means.

Another very important feature of the invention resides in effecting scanning movements at a rapid rate to obtain a visible indication of moving reflecting interfaces without flicker. This feature is extremely important in the examination of organs such as heart in that it permits determination that particular echo indications are being produced from a moving part and that other echo indications are not being produced thereform. It is also possible to readily distinguish the effect of extraneous indications such as those produced from mupltiple reflections. An additional specific feature of the invention, relates to the mounting of a transducer assembly on a plate which may be readily mounted in existing X-ray systems by merely inserting the plate in guide ways provided for a palpation diaphragm.

Additional specific features of the invention relate to mounting means for the transducer in order to obtain ready adjustment of its position while obtaining the required scanning movements, and to electronic circuitry for obtaining indications correlated to the scanning movement of the transducer.

The possible diagnostic uses of the system of this invention are endless in number. As but one example, it is possible with the system to quickly obtain a highly accurate and reliable diagnosis with respect to pericardial effusion in which an effusion fluid has entered a region between the outer surface of the myocardium and the pericardium (the membranous sac which contains the heart). An X-ray examination alone gives the appearance of an enlarged heart, but with the ultrasonic system of this invention, it is possible to obtain indications which are accurately identified as being produced by reflections from the myocardium and pericardium at the back of a heart.

This invention contemplates other and more specific objects, features and advantages which will become more fully apparent from the following detailed description taken in conjunction with the accompanying drawings which illustrate a preferred embodiment and in which.

Reference numeral 20 generally designates a medical diagnostic system constructed in accordance with the principles of this invention. The illustrated system 20 is constructed by adding ultrasonic apparatus including a control and indicating unit 21 to X-ray fluoroscopic apparatus 22 of a type known in the art.

Figure 1:
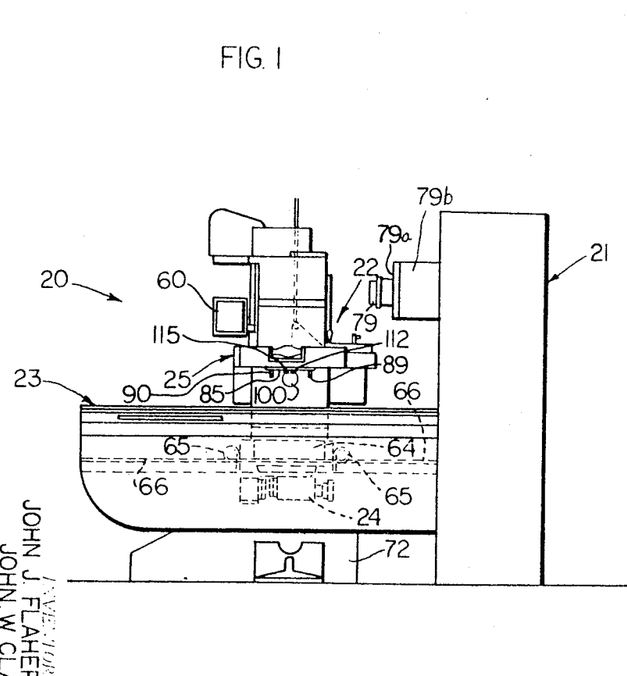
FIGURE 1 is a front elevational view of a medical diagnostic system constructed in accordance with the invention, including combined ultrasonic and X-ray fluoroscopic apparatus.
Figure 2:
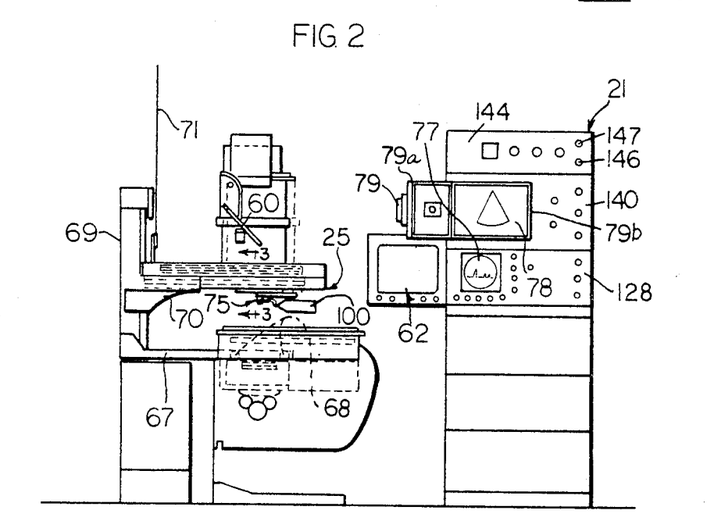
FIGURE 2 is a side elevational view of the system as shown in FIGURE 1.

The X-ray fluoroscopic apparatus 22 comprises an examination table 23 for supporting a patient, an X-ray tube 24 in the table 23 movable to a position below the portion of a patient's body to be examined, and X-ray receiving means on a carrier 25 above the table 23, movable to a position over the portion of the patient's body to be examined.

Three different selectively usable X-ray receiving means are supported by the carrier 25. In particular, as shown in the cross-sectional view of FIGURE 3, a cassette tray 26 is provided for holding a film-carrying cassette and is supported by means of rollers 27 and 28, engaged with internal guide rails 29 and 30 of the carrier, for movement from a rearward inoperative position to a forward operative position over the portion of the body to be examined. Suitable means of conventional form, not shown, may be provided for controlling the forward and rearward movement of the cassette tray 26.

Figure 3:
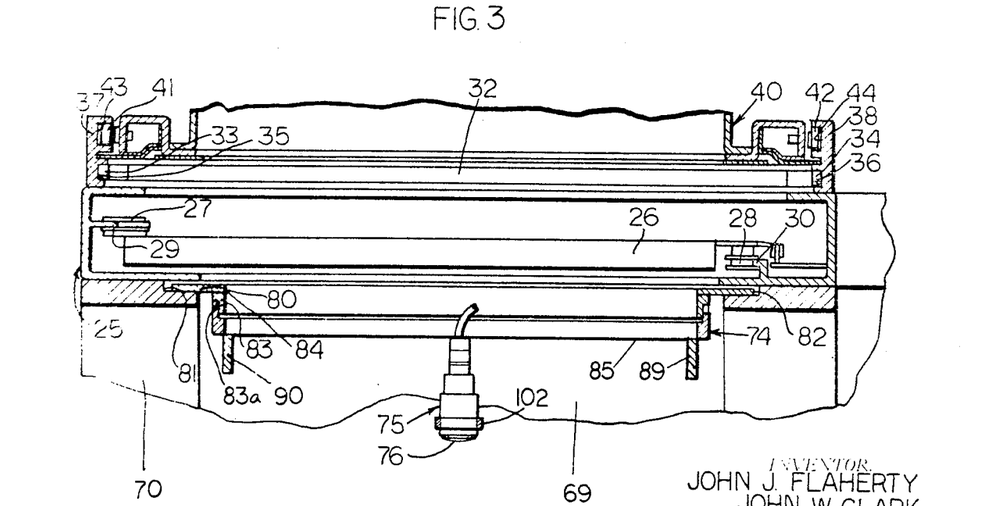
FIGURE 3 is a sectional view taken substantially along line III—III of FIGURE 2, illustrating the mounting of selectively usable X-ray receiving means and ultrasonic transducer means on a carrier.

In addition, a fluoroscopic screen 32 is supported by means of rollers 33 and 34 in guide tracks 35 and 36 formed on the inside of side walls 37 and 38 of the carrier 25, for movement from a rearward inoperative position to a forward operative position over the portion of the body to be examined. An image is then produced on the screen 32 in the form of a shadow field pattern of X-rays transmitted through the portion of the body being examined. During such examination, the X-rays must be of low intensity, to avoid damage to the patient, and the room is usually darkened when using the screen 32.

A third X-ray receiving means is provided in the form of an image amplifier unit 40 which permits a clear image to be obtained with X-rays of much lower intensity. The image amplifier unit is supported by means of rollers 41 and 42 movable in additional tracks 43 and 44 formed in the inside surfaces of the side walls 37 and 38, for movement from a rearward inoperative position to a forward operative position over the portion of the body to be examined.

Figure 4:
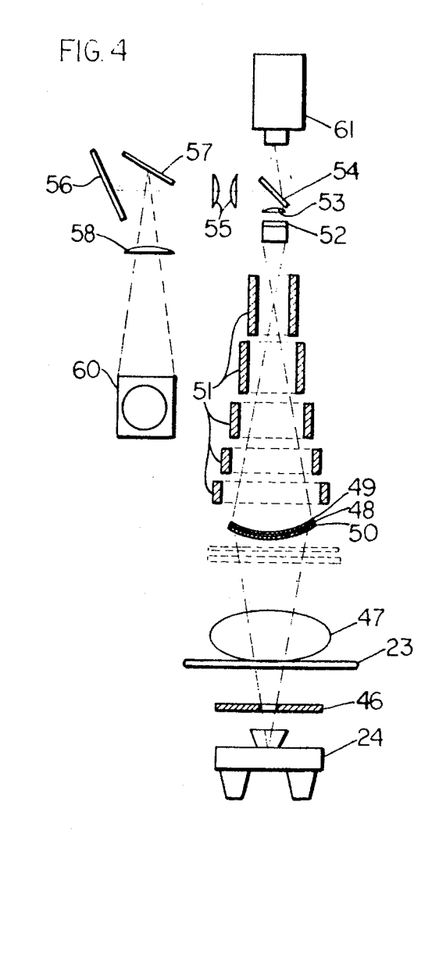
FIGURE 4 is a schematic diagram of the construction of an image amplifier unit of the system of FIGURE 1, also illustrating the paths of light rays therein and the paths of X-rays projected thereto from an X-ray tube.

FIGURE 4 diagrammatically illustrates the construction of the image amplifier unit, as well as the paths of light rays therein, and the paths of X-rays projected thereto from the X-ray tube 24. As shown, X-rays pass from the X-ray tube 24 through an X-ray limiting diaphragm 46 and thence through a portion of the body 47 of a patient lying upon the table 23, and thence to an input fluorescent screen 48 adjacent a photoelectrically emissive member 49, screen 48 and member 49 being disposed on a support 50 which is substantially transparent to X-rays. A light image produced on the screen 48 from X-rays applied through the body 47 causes the emission of electrons by the member 49 in a pattern corresponding to the light image of the screen 48. Such electrons are accelerated to a high velocity and focused by a condensing electronic lens system including electrodes 51 and impinge on a phosphor screen 52 to develop a light image which is applied through a lens 53 to a mirror 54 to be reflected therefrom and thence to pass through lens 55 to a mirror 56 to be reflected to a mirror 57 and to thence be reflected through a lens 58 to a mirror 60. As shown in FIGURES 1 and 2, the mirror 60 is in a position for viewing of the image by the examining physican.

In addition, a suitable television camera 61 may be mounted behind the mirror 54 to receive the image from the phosphor screen 52, the mirror 54 being of a partially transmitting material. Camera 61 develops a video signal which is applied to a monitor 62. Monitor 62 may be located at any convenient position for viewing by the examining physician, but is preferably located on or adjacent the ultrasonic control and indicating unit 21, so that the examining physician can readily compare the fluoroscopic image with the ultrasonic indications.

To facilitate accurate location of the X-ray transmitting and receiving means relative to the body to be examined, the X-ray tube 24 is mounted on a carriage 64 within the table 23. The carriage 64 is supported by means of rollers 65 on tracks 66, for movement of the carriage 64 lengthwise to any desired position.

To obtain concurrent movement of the X-ray receiving means, a horizontal beam 67 has a forward end supported on the carriage 64 by means of rollers 68 and at its rearward end carries a vertical column 69 on which the carrier 25 is supported by means of a bracket 70, the bracket being supported for adjustable vertical movement on the column 69. To carry part of the weight of the carrier 25, a cable 71 may be connected thereto and to an overhead support structure of known construction, not shown.

The table is supported on a floor by a suitable frame structure 72. Although the table 23 is illustrated in a horizontal position in the drawings, the support from the frame structure 72 is preferably such that the table 23 may also be disposed in a vertical position in which the patient can stand between the table surface and the X-ray receiving means on the carrier 25.

In accordance with important features of the invention, an ultrasonic transducer assembly 74 is supported on the carrier 25, including a transducer 75 having an end face 76 arranged to be acoustically coupled to the patient's body, for a correlated examination of the same portion of the body tested by X-ray means. The end face 76 may be directly engaged with the skin or surface of the body, using a suitable coupling fluid, or the transducer may transmit or receive ultrasonic waves through a liquid with both the body and the transducer being immersed, or the transducer may transmit and receive through a container having a flexible wall of plastic adapted to conform to bodily contours and provide acoustic coupling.

With this combination of X-ray and ultrasonic testing it is possible to obtain much more complete information as to the internal bodily structure since X-rays and ultrasonic waves have different transmission characteristics and ultrasonic waves are affected by interfaces within the body, where two adjoining regions have different characteristics with respect to the velocity of transmission of sonic waves. For these reasons and because one test can be used as a check against the other, it is possible to obtain much more complete and reliable information than would be possible with tests made separately at different times.

Preferably, and in accordance with a specific feature of the invention, the transducer 75 is positioned between the X-ray receiving means and the body to produce a shadow in the shadow field pattern of the X-ray image. Thus, it is possible with the X-ray image to determine the exact location of the transducer. This facilitates placing of the transducer at a desired location for testing, and also provides very important information for diagnostic purposes, since the location of the transducer relative to shadow-producing internal bodily parts of low X-ray transmission characteristics can be readily and accurately determined.

A through-transmission ultrasonic testing operation could be employed, using the transducer 75 only for receiving, with an additional transmitting transducer on the opposite side of the body. Preferably, however, a pulse-echo operation is employed with the transducer 75 being used for both transmitting and receiving. In the pulse-echo operation, a pulse is periodically generated by circuitry within the unit 21 and is applied to the transducer 75 to cause it to transmit a burst of ultrasonic waves into the body. The burst of ultrasonic waves is partially reflected by interfaces within the body, to return to the transducer 75 and to generate echo signals, which are amplified within the unit 21 and are applied to indicating means thereof.

In particular, the illustrated unit 21 comprises an "A-scan" indicator in the form of a cathode ray tube having a face or screen 77. A spot of light produced on the screen 77 is deflected horizontally by a sawtooth wave synchronized with the pulsing of the transducer, while received echo signals are used to deflect the spot in a vertical direction, to produce "pips" on the screen 77. The positions of such pips, measured from the left side of the screen 77, are measures of the depths within the body of the interfaces producing the echo signals.

In accordance with a further very important feature of the invention, an additional "B-scan" operation is employed, to produce a cross-sectional pattern on the face or screen 78 of another cathode ray tube in the unit 21. To produce the cross-sectional pattern, a spot on the screen 78 is deflected in synchronism with the pulsing of the transducer to produce a trace on the screen, preferably starting adjacent the upper edge of the screen and moving downwardly, while the position of the trace moves in a transverse direction to effect a scanning movement, preferably horizontally, in synchronism with a scanning movement of the ultrasonic beam produced by transducer 75. The intensity of the spot, meanwhile, varies in response to echo signals received by the scanning transducer. A camera 79, mounted on a door 79a hinged on a light shield 79b about the screen 78, is usable for recording the image produced on screen 78 at a particular time. Door 79a is shown closed in FIGURE 1, to permit use of the camera 79, and is shown open in FIGURE 2, to permit viewing of screen 78.

In the illustrated system, the transducer 75 is supported in a manner such as to permit two types of scanning movements, alone or in combination. In particular, the transducer 75 is so supported as to permit translational scanning movement in the form of reciprocable movement along a certain axis, preferably located generally parallel to a surface of the body and generally transverse to the direction of travel of the ultrasonic waves. A corresponding movement of the trace on the screen 78 is then produced.

In addition, the transducer is supported for oscillatory movement about a certain axis which is preferably in approximate alignment with the end face 76 of the transducer and generally transverse to the axis of translational movement. Corresponding to this movement of the transducer, a sweeping oscillatory movement of the trace on the screen 78 is produced, preferably about a point adjacent the upper edge of the screen 78. With this arrangement, a sector scan is produced, which is highly advantageous, particularly in that the scanning can be accomplished with the transducer end face directly engaged with the surface of the body. It is also an advantage when a liquid coupling medium is employed in that undesirable agitation of the liquid is minimized.

An additional very important feature resides in effecting scanning movements at a rapid rate at least on the order of 15 scanning movements per second, which results in the production of visible moving reflecting interfaces, without flicker. This feature is extremely important in the examination of the heart and is also important with respect to other organs having moving interfaces, because it enables the examining physician to readily determine that particular echo indications are being produced from such moving organs, and that other echo indications are not being produced from such organs. In practice, it is possible to distinguish readily the effect of extraneous indications such as those produced from multiple reflections, which has not been the case with prior systems.

Although it is possible to use other types of transducers, the transducer preferably has an end face 76 which is convex to provide a rolling contact with the skin, and to facilitate the rapid scanning operation. At the same time, materials are used having acoustical characteristics such as to focus the ultrasonic energy into a concentrated beam for greatly improved performance.

Before describing the means for obtaining the above described scanning movements, it is noted that in accordance with a specific feature of the invention, the transducer assembly 74 includes a mounting plate 80 having opposite side edge portions disposed in tracks or slots 81 and 82 in opposite inside wall portions of the carrier 25. Slots such as the slots 81 and 82 are provided in almost all commercially available X-ray fluoroscopic systems of the type illustrated, for the purpose of providing guide ways for a palpation diaphragm. Palpation diaphragms are used to attempt to shift internal organs of the body in order to obtain a better image with respect to certain organs or the like. A palpation diaphragm is generally in the form of a plate at least a central portion of which is transparent to X-rays and which includes a central downwardly extending cup-like portion with a rounded lower end to be pressed into the body and to be shifted around to manipulate internal organs. Accordingly, the ultrasonic system may be readily applied to existing systems by merely inserting the mounting plate 80 in the slots or guide ways provided for the palpation diaphragm. Conversely, a complete X-ray and ultrasonic system as illustrated is readily converted for use with a palpation diaphragm, by merely removing the transducer assembly 74 with its mounting plate 80, and moving the palpation diaphragm into position.

To support the transducer 75 from the mounting plate 80, a ring 83 is secured to the plate 80, at the edge of a large circular opening 84 formed in the plate 80.

Figures 5, 6:
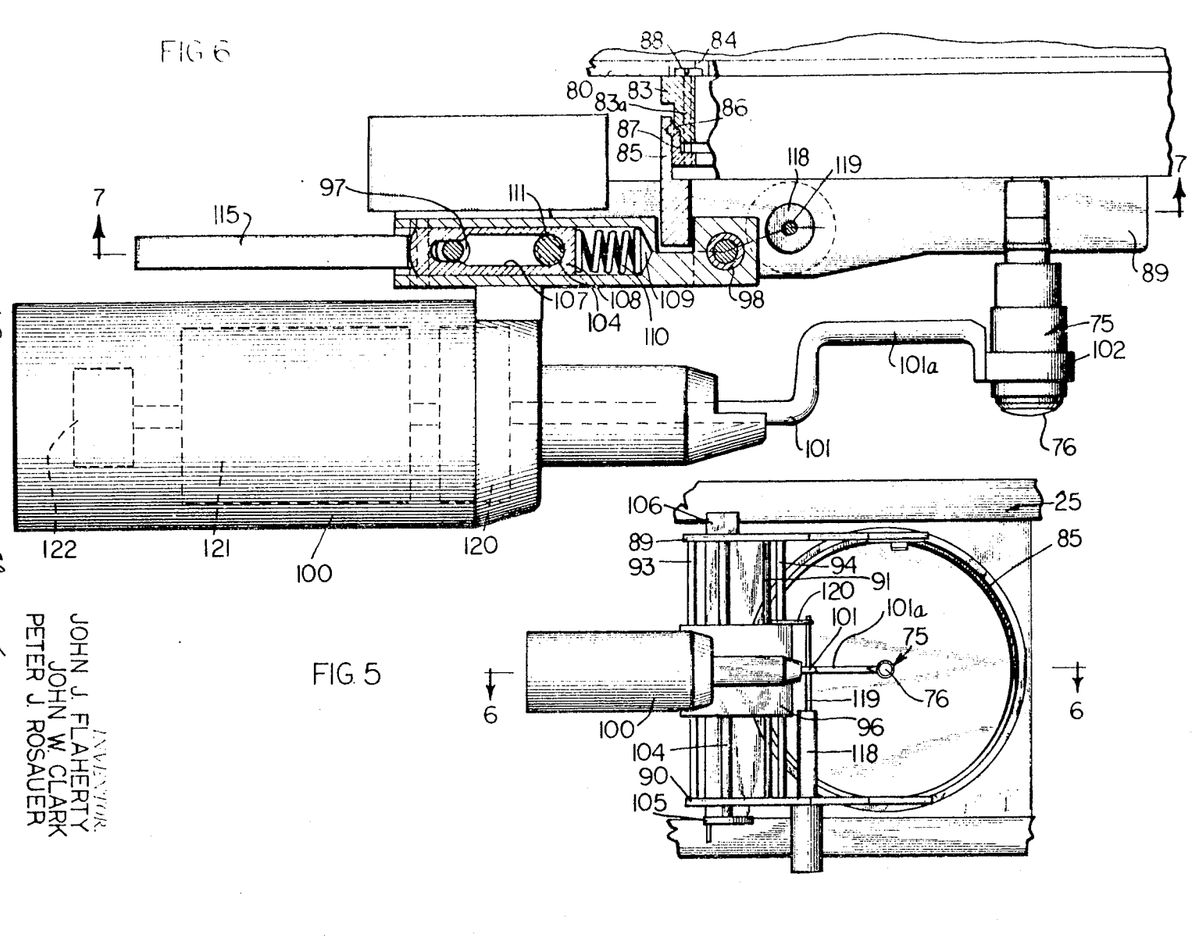
FIGURE 5 is a bottom plan view of an ultrasonic assembly of the system.
FIGURE 6 is a sectional view taken substantially along line VI—VI of FIGURE 5.
Figure 7:
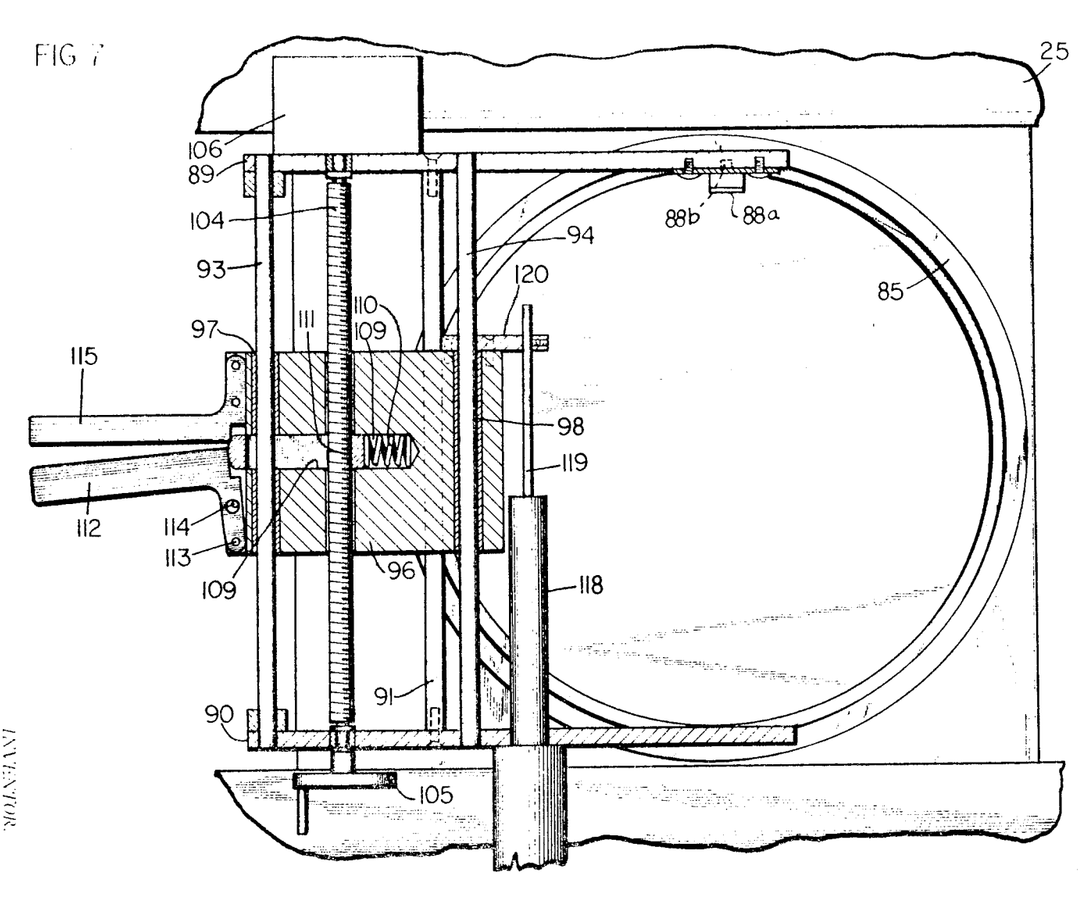
FIGURE 7 is a sectional view taken substantially along line VII—VII of FIGURE 6.

As best shown in FIGURE 6, the ring 83 has a lower portion 83a of reduced diameter which extends within an upper end portion of a ring 85 rotatable thereon. To control friction, a bearing strip 86, preferably of Teflon, is disposed in an internal groove of the ring 85, while a clamping ring 87 is fixed on the ring 83 and is arranged for adjustable axial movement to control the degree of pressure between the bearing strip 86 and the ring 85. The clamping ring 87 is preferably adjustable axially by means of a series of angularly spaced screws 88, with relatively close spacing between the screws 88 such that a uniform pressure can be obtained between the bearing strip 86 and the ring 85 at all points. With this arrangement, a smooth adjustment of the angular position of the ring 85 is possible. To lock the ring 85 in an adjusted angular position, a plate 88a of resilient sheet metal is secured at an intermediate fulcrum point to a bar 89 affixed to ring 85 and carries at one end thereof a pin 88b engageable in a selected one of a series of holes in ring 83, pin 88b being movable inwardly to a released position by moving the opposite end of plate 88a readily outwardly.

The bar 89 and an additional bar 90 extend tangentially in parallel relation from diametrically opposed portions of the ring 85. A rigidifying bar 91 extends between the bars 89 and 90 and in addition, a pair of cylindrical guide rods 93 and 94 extend in parallel relation between the bars 89 and 90 for supporting a carriage 96 for axial movement thereon, suitable anti-friction sleeve bearings 97 and 98 being within openings in the carriage through which the guide rods 93 and 94 extend.

The carriage 96 supports a drive unit 100 which is arranged to controllably oscillate a shaft 101 about an axis transverse to the direction of movement of the carriage 96 on the guide bars 93 and 94 and in a plane transverse to the axis of movement of the support ring 85. A clamp ring 102 is secured to the inner end of the shaft 101 to carry the transducer 75, with the end face 76 of the transducer 75 being preferably located substantially on the axis of oscillating movement of the shaft 101. Preferably, the shaft 101 has an intermediate portion 101a offset from the axis of oscillating movement, to facilitate engagement of the transducer face 76 with a desired point of the body.

When the carriage 96 is midway between the support bars 89 and 90, the transducer 75 is preferably on the axis of the ring 85, so that by moving the carriage 96 on the support rods 93 and 94, the transducer 75 may be moved radially outwardly until the carriage 96 engages one or the other of the bars 89 or 90. The angular position of the ring 85 may be adjusted as above described, so that the transducer 75 can thus be moved to any position within a certain radial distance from the axis of rotation of the ring 85.

To control movement of the carriage 96 on the support rods 93 and 94, a lead screw 104 extends between the bars 89 and 90 and is journalled for rotation about an axis parallel to the support rods 93 and 94. The lead screw 104 is rotatable either by hand wheel 105, or by a control motor 106.

In accordance with a specific feature of the invention, the carriage 96 is releasably engageable with the lead screw 104, so that, when desired, it may be freely moved along the rods 93 and 94. In particular, the lead screw 104 extends through the slot 107 of a plunger 108 disposed in a central opening 109 of the carriage 96. The plunger 108 is urged outwardly by a coiled compression spring 110 to engage a threaded inner end portion 111 of the slot 107 with the main screw 104. To move the plunger 108 inwardly and thus disengage the threaded portion 111 from the lead screw 104, a first L-shaped handle member 112 is pivoted on a pin 113 carried by the carriage 96 and is arranged to engage the outer end of the plunger. Outward movement of handle 112 is limited by a pin 114 disposed within an enlarged opening of the handle 112. Preferably, a second L-shaped handle 115 is secured to the carriage 96 adjacent the pivotal handle 112, so that the operator can grasp the handles 112 and 115 in his hand and exert a squeezing action to pivot the handle 112 and release the carriage from the lead screw, after which he can move the carriage 96 along the support rods 93 and 94 to a desired position. He can also move the carriage back and forth rapidly to obtain a cross-sectional pattern on the screen 78.

To correlate indications produced on the screen 78 of the indicating unit 21 with movement of the carriage 96 along the support rods 93 and 94, a linear potentiometer unit 118 is secured to the bar 90 and has an actuating rod 119 parallel to the direction of movement of the carriage 96, with the end of rod 119 being secured to a plate 120 secured to the carriage 96.

The details of construction of the drive unit 100 form no part of the present invention, except that it includes an electric motor 120 coupled to the shaft 101 and operable to effect oscillation thereof at a rapid rate, and a resolver 121 also coupled to the shaft 101, and effective to translate angular movement of the shaft 101 into electrical signals, for correlating indications on the screen 78 with the oscillation of the shaft 101. In addition, the unit 100 may include a potentiometer 122, also coupled to the shaft 101, and connected in a circuit for controlling the degree of oscillation of the shaft 101.

Figure 8:
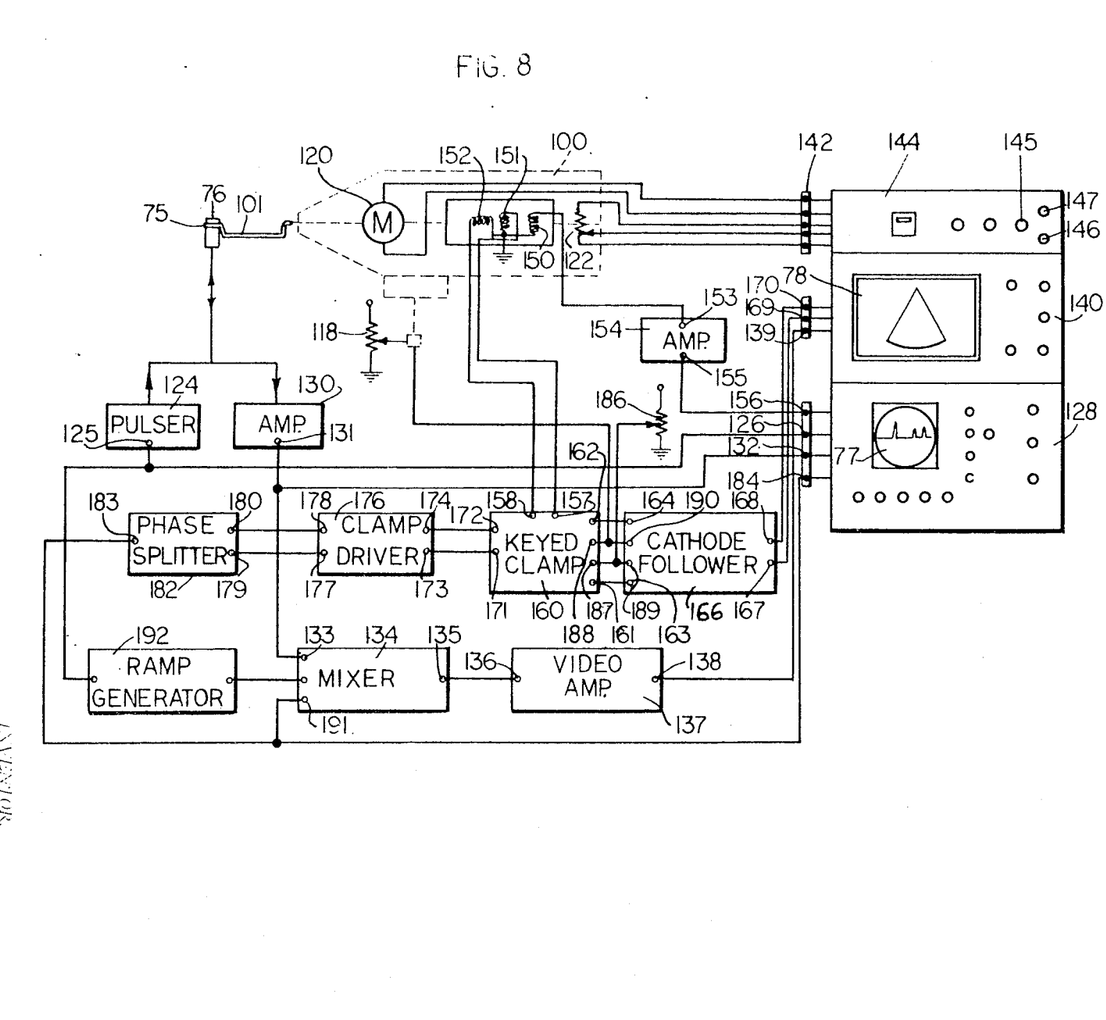
FIGURE 8 is a schematic block diagram of the electrical and electronic portions of the system.

FIGURE 8 is a schematic block diagram showing the system for producing indication on the screens 77 and 78 in response to echo signals from the transducer 75 and in accordance with movements of the transducer 75.

The transducer 75 is energized from a pulser 124 which has an input terminal 125 connected to a terminal 126 on a terminal board or jack of a unit 128. Unit 128 includes a cathode ray tube having the screen 77 for producing the A-scan indication, and also includes timing and sweep generating circuitry of a type conventional in the oscilloscope art. Such circuitry generates a timing signal at the terminal 126 which is applied to the input terminal 125 of the pulser 124 to cause the transducer 75 to emanate a burst of ultrasonic waves. Echo signals generated by the transducer 75 are applied to the input of an amplifier 130 having an output terminal 131 connected to a terminal 132 of the unit 128, to be applied through amplifier circuits thereof to the vertical deflection plates, and to produce pips on the screen 77 in response to such echo signals.

The output terminal 131 of the amplifier 130 is also connected to an input terminal 133 of a mixer 134 having an output terminal 135 connected to an input terminal 136 of a video amplifier 137 having an output terminal 138 connected to a terminal 139 of a terminal board or jack of a unit 140. Unit 140 includes a cathode ray tube having the above-described screen 78, and also includes conventional circuitry for applying voltages to the cathode ray tube to impinge an electron beam on the screen, as well as deflection circuitry for energizing horizontal and vertical detection plates or coils. Terminal 139 is connected either directly or through an amplifier in the unit 140 to the grid of the cathode ray tube therein to intensify the electron beam and brighten the spot in response to echo signals produced by the transducer 75.

To controllably oscillate the transducer 75, the motor 120 and the potentiometer 122 are connected to terminals of a board or jack 142 of a control unit 144 which, although having a number of desirable and advantageous features, forms no part of the present invention, and is therefore not illustrated or described in detail. It may be noted, however, that the unit 144 includes an adjustable speed control knob 145, an angle control knob 146 which controls the angle of oscillatory movement, and an attitude control knob 147 which controls the mean angle of the oscillatory movement.

As above indicated, the resolver 121 is effective to translate angular movement of the shaft 101 into electrical signals for correlating indications on the screen 78 with the oscillation of the shaft. In particular, the resolver 121 includes a stator coil 150 and a pair of rotor coils 151 and 152 located at right angles to each other and inductively coupled to the stator coil 150, to generate signals having sine and cosine functions of a signal applied to the stator coil 150.

Stator coil 150 is connected to an output terminal 153 of an amplifier 154 having an input terminal 155 connected to a terminal 156 of the unit 128. An internal sweep circuit of the unit 128 operates to generate a sawtooth signal at the terminal 156 which is amplified by the amplifier 154 and applied to the stator coil 150. The rotor coils 151 and 152 then develop corresponding sawtooth signals, having amplitudes which are sine and cosine functions of the angular position of the shaft 101.

Rotor coils 151 and 152 are respectively coupled to input terminals 157 and 158 of a keyed clamp circuit 160 having a pair of output terminals 161 and 162 connected to input terminals 163 and 164 of a cathode follower circuit 166 having output terminals 167 and 168 connected to terminals 169 and 170 of the unit 140. Terminals 169 and 170 are connected directly or through amplifier circuits in the unit 140 to the horizontal and vertical deflection plates or coils of the cathode ray tube therein. In the system as illustrated, the terminal 169 is connected to the horizontal deflection circuit and is controlled from the signal developed by coil 151, while terminal 170 is connected to the vertical deflection circuit and is controlled by the signal from coil 152.

The system may be operated in a manner such that with the axis of the transducer 75 in a vertical position, the coil 151 is at right angles to the stator coil 150, so that no signal is applied to the horizontal deflection input terminal 170, while the coil 152 is aligned with the stator coil 150 to generate a maximum signal which is applied to the vertical deflection input terminal 170. A vertical trace is then developed on the screen 78 starting at a point adjacent the upper edge thereof and moving downwardly under control of the sawtooth sweep signal.

With the transducer 75 moving down slightly away from its vertical position, a signal is developed by the rotor coil 151 which is applied to the keyed clamp circuit 160 and the cathode follower 166 to the horizontal deflection input terminal 169, to thereby cause the sawtooth horizontal deflection signal of small amplitude to be applied along with the larger amplitude sawtooth vertical deflection signal. The trace then moves angularly downwardly and either to the left or right depending upon the direction of displacement of the transducer 75 from its vertical position and with further movement away from the vertical position, the amplitude of the horizontal deflection signal is increased, while the amplitude of the vertical deflection signal is decreased. Accordingly, the position of the trace on the screen 78 accurately corresponds to the angular position of the transducer 75.

When the transducer 75 is oscillated, the trace on the screen 78 is caused to sweep through a certain arc about a center which is preferably adjacent the upper end of the screen 78, to thereby produce a sector scan indication, as diagrammatically illustrated in FIGURE 8.

The keyed clamp circuit 160 operates to fix the signal level at the output terminals 161 and 162 thereof during time intervals between the applied sawtooth signals. To control operation of the keyed clamp circuit 160, input terminals 171 and 172 thereof are connected to output terminals 173 and 174 of a clamp driver circuit 176 having input terminals 177 and 178 connected to output terminals 179 and 180 of a phase splitter circuit 182 having an input terminal 183 connected to an output terminal 184 of the unit 128. The timing and sweep circuitry of the unit 128 generates an unblanking pulse at the terminal 184 which is applied to the input terminal 183 of the phase splitter 182. The phase splitter 182 then operates to apply square wave signals of opposite polarity to the clamp driver circuit 176 which in turn operates the keyed clamp circuit 160 to fix the levels during time intervals between the sawtooth signals.

The levels at which the signals are fixed are controllable to control the position of the trace or sector scan produced on the screen 78. In particular, the potentiometer 118 and a manually adjustable potentiometer 186 are connected to terminals 187 and 188 of the keyed clamp circuit 160 and terminals 189 and 190 of the cathode follower 166. As above described, the potentiometer 118 is controlled by movement of the carriage 96, and it operates to shift the base level of the horizontal deflection signal, so that the trace or the sector scan indication is moved horizontally on the screen 78 in response to movement of the carriage 96.

It is noted at this point that although the horizontal and vertical relationship of the movements and indications is generally preferred, the movements can be effected in any direction, and the terms horizontal and vertical are used herein only for ease and clarity of description, and are not to be construed as limitations.

The mixer 134 has an input terminal 191 to which the unblanking signal from terminal 184 is applied. An additional input terminal of the mixer 134 is connected to the output of a ramp generator 192 having an input connected to the terminal 126 of unit 128. Ramp generator 192 is of a type known in the radar art and applies a signal to increase the amplification of echo signals in proportion to the distance from the transducer so as to compensate for attenuation of signals and also to compensate for the fact that with the sector scan the separation of trace lines increases in proportion to the distance from the transducer.

As noted above, a very important feature of the invention resides in effecting the scanning movement at a rapid rate such as to produce a visible indication of moving reflecting interfaces without flicker. In the illustrated system, the oscillations of the transducer back and forth should be effected at the rate of at least 7.5 complete oscillations per second, to produce 15 scans per second, and preferably the oscillations are effected at the rate of at least 10 oscillations per second to produce 20 scans per second. The oscillations are most preferably effected at an even higher rate to avoid distortions and obtain an accurate indication of distance. The fast scan feature is very important in permitting interpretation of an indication while it is being produced on the screen 78 and is also important when the camera 79 is used for recording the indication produced at a particular time in avoiding a blurring effect which is produced with a slow scan operation.

The pulsing rate, i.e. the repetition rate of the sawtooth signals applied to the resolver stator coil 150 should be much higher than the scanning rate, preferably on the order of 500 per second, in order to avoid distortions of the pattern in the screen 78 and in order to obtain the highest possible accuracy.

Figure 9:
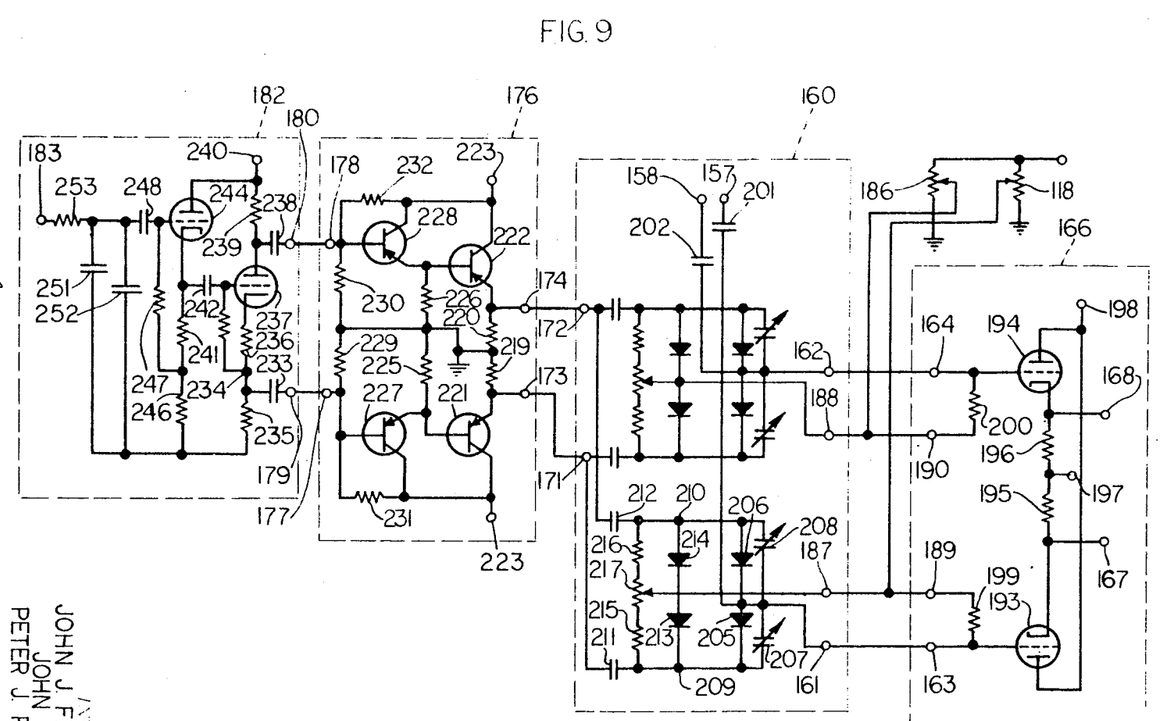
FIGURE 9 is a circuit diagram of cathode follower, keyed clamp, clamp driver and phase splitter circuits of the electronic system shown in block form in FIGURE 8.

FIGURE 9 is a circuit diagram showing the circuits of the keyed clamp 160, the cathode follower 166, the clamp driver 176 and the phase splitter 182. The output terminals 167 and 168 of the cathode follower 166 are connected to the cathodes of a pair of triodes 193 and 194 and also through a pair of resistors 195 and 196 to a power supply terminal 197 which may be a minus 28 volts relative to ground, for example. The plates of the triodes 193 and 194 are connected to a power supply terminal 198 which may be at plus 28 volts relative to ground, for example. The grids of the triodes 193 and 194 are connected directly to the terminals 163 and 164 which are connected to terminals 161 and 162 of the keyed clamp circuit 160, and the grids are also connected through resistors 199 and 200 to the terminals 189 and 190 which are connected to the terminals 187 and 188 of the keyed clamp circuit 160. Terminals 161 and 162 are connected through coupling capacitors 201 and 202 to the terminals 157 and 158 which are connected to the horizontal and vertical rotor coils 151 and 152 of the resolver 121, so that the sawtooth sweep voltages developed by the coils 151 and 152 are applied through the coupling capacitors 201 and 202 to the grids of the triodes 193 and 194 to develop corresponding sawtooth voltages at the output terminals 167 and 168 which are coupled to the horizontal and vertical deflection means of the unit 140.

The keyed clamp circuit 160 functions to fix the potentials at the circuit points 161 and 162 during time intervals between such sawtooth sweep signals and to thereby obtain a fixed reference, which functions to stabilize the pattern produced on the screen 78, irrespective of variations in power supply voltages and the like. The reference potentials are determned by the piotentiometers 118 and 186, potentiometer 118 being responsive to rectilinear movement of the carriage 96, while potentiometer 186 is manually adjustable. Potentiometers 118 and 186 are connected between power supply terminals which may preferably be operated at negative and positive potentials relative to ground.

To fix the potential at the terminal 161 during time intervals between the sweep signals, terminal 161 is connected through diodes 205 and 206 and variable capacitors 207 and 208 to circuit points 209 and 210 which are connected through capacitors 211 and 212 to the terminals 171 and 172, circuit points 209 and 210 being connected through diodes 213 and 214 to the terminal 187 and being also connected through resistors 215 and 216 to a potentiometer 217 having a movable contact connected to the terminal 187.

In operation, during unblanking time intervals when the sweep signals are being applied to the terminals 157 and 158, a positive signal is applied at the terminal 171 while a negative signal is applied at the terminal 172 and the diodes 205, 206, 213 and 214 are then non-conductive so that the clamping circuit has substantially no effect on the operation. During such unblanking time intervals, the capacitors 211 and 212 may accumulate a certain charge and during time intervals between the unblanking time intervals, the potential of the terminal 171 swings in a negative direction while the potential of the terminal 172 swings in a positive direction to thus cause conduction of the diodes 205, 206, 213 and 214. The potential of the terminal 161 is then fixed at a value substantially equal to that of the terminal 187 which is connected to the movable contact of the potentiometer 118.

A subsantially identical circuit is provided between terminals 162, 188, 171 and 172, for fixing the potential of the terminal 162 during time intervals between the sawtooth sweep signal applied to the terminal 158 at a value substantially equal to that of the movable contact of potentiometer 186.

Terminals 171 and 172 are connected to the terminals 173 and 174 of the clamp driver circuit. In particular, terminals 173 and 174 are connected to a ground through a pair of resistors 219 and 220 and also to the emitters of a pair of transistors 221 and 222, operated as emitted-followers, having collectors connected to a power supply terminal 223. The base electrodes of the transistors 221 and 222 are connected through resistors 225 and 226 to ground and also to the emitters of another pair of transistors 227 and 228 operated as emitter-followers, having collectors connected to the power supply terminal 223. The base electrodes of transistors 227 and 228 are connected directly to the terminals 177 and 178, through resistors 229 and 230 to ground, and through resistors 231 and 232 to the power supply terminal 223. Positive and negative-going signals are applied to the terminals 177 and 178, respectively, during unblanking time intervals, from the phase splitter circuit 182. In particular, terminal 179 is connected through a coupling capacitor 233 to a circuit point 234 connected to ground through a resistor 235 and connected through a resistor 236 to the cathode of a triode 237 having a plate coupled through a coupling capacitor 238 to the terminal 180 and connected through a resistor 239 to a power supply terminal 240. The grid of the triode 237 is connected through a resistor 241 to the circuit point 234 and through a coupling capacitor 242 to the cathode of a triode 244, connected through resistors 245 and 246 to ground. The grid of the triode 244 is connected through a resistor 247 to the junction between resistors 245 and 246 and is also connected to a coupling capacitor 248 to a circuit point 250 connected through a variable capacitor 251 and a fixed capacitor 252 to ground and connected through a resistor 253 to the terminal 183.

In operation, an unblanking signal of positive polarity is applied to the input terminal 183 from the unit 128, the signal being lengthened to some degree by the capacitors 251 and 252 operating in junction with resistor 253. The signal is applied through the coupling capacitor 248 to the triode 244 which operates as a cathode follower to apply a corresponding signal to the grid of the triode 237. Triode 237 operates as a phase splitter to develop a positive-going signal at the circuit point 234 and a negative-going signal at the plate thereof. Such signals are applied through the transistors 227 and 228 and the transistors 221 and 222 to develop corresponding signals at the terminals 173 and 174 and to effect operation in a manner as above described.

By way of illustrative example, and not by way of limitation, the circuit components may have values according to the following table, wherein the values of resistors are in ohms, with K representing thousands of ohms and M representing megohms, and wherein the values of capacitors are in microfarads unless followed by "pf.," indicating picofarads.

| Reference numeral: | Value |
|---|---|
| 195 | 3.9K |
| 196 | 3.9K |
| 199 | 12M |
| 200 | 12M |
| 201 | .001 |
| 202 | .001 |
| 207 | pf.. 0–20 |
| 208 | pf.. 0–20 |
| 211 | 1 |
| 212 | 1 |
| 215 | 300K |
| 216 | 100K |
| 217 | 300K |
| 219 | 1K |
| 220 | 1K |
| 225 | 1K |
| 226 | 1K |
| 229 | 62K |
| 230 | 62K |
| 231 | 15K |
| 232 | 15K |
| 233 | 1 |
| 235 | 15K |
| 236 | 1K |
| 238 | 1 |
| 239 | 15K |
| 241 | 470K |
| 242 | .1 |
| 245 | 3K |
| 246 | 7.5K |
| 247 | 470K |
| 248 | .1 |
| 251 | pf.. 0–20 |
| 252 | pf.. 910 |
| 253 | 4.7K |

It will be understood that modifications and variations may be effected without departing from the spirit and scope of the novel concepts of this invention.

We claim as our invention:

1. In a medical diagnostic system for the examination of a body, X-ray generating means for transmitting X-rays into one side of the body, X-ray receiving means positioned on the opposite side of the body to receive an image in the form of a shadow field pattern of X-rays transmitted through a portion of the body, ultrasonic transducer means positioned between said X-ray receiving means and said opposite side of the body to produce a shadow in said pattern showing the location of said transducer means relative to shadows produced by bodily parts of low X-ray transmission characteristics, means for energizing said transducer means to transmit ultrasonic waves into said portion of the body, and means for indicating ultrasonic waves received from said portion of the body.

2. In a medical diagnostic system for the examination of a body, first energy transmitting and receiving means arranged to transmit pulses of energy into the body and to receive echoes from interfaces therewithin, first indicating means associated with said first transmitting and receiving means and arranged to present a cross-sectional view indicating the positions of said interfaces, second energy transmitting and receiving means arranged to transmit energy into the body and to receive energy therefrom, and second indicating means associated with said second transmitting and receiving means and arranged to present a plan view indication of interior structures of the body, said first transmitting and receiving means being so located relative to said second transmitting and receiving means as to show the position of said first transmitting and receiving means in said plan view indication, said first energy transmitting and receiving means being operative with ultrasonic wave energy.

3. In a medical diagnostic system for use with X-ray apparatus including X-ray generating and receiving means and first and second support means for respectively supporting said X-ray generating and receiving means on opposite sides of the body for passage of X-rays through a portion of the body to said receiving means, said second support means having a palpation diaphragm guide way therein, ultrasonic testing means comprising: a support arranged for disposition in said guide way, ultrasonic transducer means, and means supporting said transducer means on said support plate for ultrasonic testing of said portion of the body, said support plate and said transducer means being positioned in the path of the X-rays.

4. In a medical diagnostic system as defined in claim 1, means for displaying said shadow field pattern of X-rays at a position adjacent said means for indicating ultrasonic waves.

5. In a medical diagnostic system as defined in claim 1, said transducer means being pulsed by said energizing means and being arranged to receive reflected pulses of energy from the body, and said means for indicating said received ultrasonic waves including cathode ray tube means having a screen for presenting a cross-sectional pattern of echoes received from within said portion of said body.

6. In a medical diagnostic system as defined in claim 5, fluoroscopic means for presenting said shadow field pattern to view at a position adjacent said screen of said cathode ray tube means.

7. In a medical diagnostic system as defined in claim 1, fluoroscopic means for producing an image of said shadow field pattern, a television camera for responding to said image, and a monitor for presenting said image of said shadow field pattern to view.

8. In a medical diagnostic system as defined in claim 7, said monitor being located adjacent said means for indicating ultrasonic waves.

9. In a medical diagnostic system as defined in claim 1, means for adjusting the position of said ultrasonic transducer means relative to said X-ray means to select for ultrasonic examination a desired part of said portion of the body through which said X-rays are transmitted.

10. In a medical diagnostic system as defined in claim 2, said first and second indicating means being located adjacent each other.

11. In a medical diagnostic system as defined in claim 2, means for adjusting the position of said first energy transmitting and receiving means relative to said second energy transmitting and receiving means.

References Cited
UNITED STATES PATENTS

| | | | |
|---|---|---|---|
| 3,018,375 | 1/1962 | Graves et al. | 250—77 |
| 3,086,390 | 4/1963 | Brown | 73—67.8 |
| 3,308,652 | 3/1967 | Appel et al. | 73—67.8 XR |

RICHARD C. QUEISSER, *Primary Examiner.*

JOHN P. BEAUCHAMP, *Assistant Examiner.*

U.S. Cl. X.R.

73—71.5; 128—2; 250—59